US006831376B2

(12) United States Patent
Franke et al.

(10) Patent No.: US 6,831,376 B2
(45) Date of Patent: Dec. 14, 2004

(54) METHOD AND APPARATUS FOR UNLOCKING A TRUNK LID

(75) Inventors: Harald Franke, Weissach (DE); Stefan Adams, Leonberg (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 82 days.

(21) Appl. No.: 10/233,777

(22) Filed: Sep. 4, 2002

(65) Prior Publication Data

US 2003/0058088 A1 Mar. 27, 2003

(30) Foreign Application Priority Data

Sep. 4, 2001 (DE) ........................................ 101 43 263

(51) Int. Cl.[7] .................................................. B60L 3/00
(52) U.S. Cl. .................. 307/10.1; 307/326; 340/426.29
(58) Field of Search .............................. 307/10.1–10.5, 307/326; 340/425.5, 426.29, 562, 457; 180/287, 271

(56) References Cited

U.S. PATENT DOCUMENTS 6,222,442 B1 4/2001 Gager et al. ................ 340/426
6,335,687 B1 * 1/2002 Terashima et al. ....... 340/573.1
6,339,376 B1 * 1/2002 Okada ........................ 340/562
6,369,395 B1 * 4/2002 Roessler .................. 250/462.1
6,370,481 B1 * 4/2002 Gamble ....................... 702/56
6,480,103 B1 * 11/2002 McCarthy et al. ....... 340/425.5
6,485,081 B1 * 11/2002 Bingle et al. ................. 296/76
6,489,889 B1 * 12/2002 Smith ......................... 340/457
6,496,106 B1 * 12/2002 Rodriguez ............... 340/425.5
6,621,411 B2 * 9/2003 McCarthy et al. ....... 340/425.5
6,624,741 B1 * 9/2003 Dais et al. ................. 340/5.72
6,692,056 B2 * 2/2004 Bingle et al. ................. 296/76

FOREIGN PATENT DOCUMENTS

EP 1 041 228 10/2000
WO WO 99/04119 1/1999
WO WO 00/58584 10/2000

* cited by examiner

*Primary Examiner*—Gregory J. Toatley, Jr.
(74) *Attorney, Agent, or Firm*—Crowell & Moring LLP

(57) ABSTRACT

A method and apparatus for unlocking a trunk lid of a motor vehicle is suggested which ensures that a person in the interior of the trunk can free himself from this trunk. For this purpose, an unlocking handle is provided in the interior which, when it is operated and the vehicle is standing still, unlocks the trunk lid. If, when the unlocking handle is operated, the vehicle is driving, a delay time is started after whose expiration the trunk lid is released.

17 Claims, 1 Drawing Sheet

METHOD AND APPARATUS FOR UNLOCKING A TRUNK LID

BACKGROUND AND SUMMARY OF THE INVENTION

This application claims the priority of German Application No.: 10143263.1 filed Sep. 4, 2001, the disclosure of which is expressly incorporated by reference herein.

The method according to the invention relates to the necessity of unlocking a locked trunk of a motor vehicle when, for example, a person is locked into it. From European Patent Document EP 1 041 228 (corresponding U.S. Pat. No. 6,222,442), it is known to provide an emergency unlocking device in the trunk. As a function of the signal of detectors also mounted in the trunk, a locked-in person is detected and the emergency unlocking device is cleared. A movement sensor can be used as the detector.

In the case of the wide-spread arrangement of the trunk in the rear of a motor vehicle, such an arrangement can be used without any problem.

In contrast, in the case of vehicles whose trunk is situated in the front of the vehicle, an easy unlocking of the trunk lid is dangerous when the vehicle is in motion because, when unlocked during the drive, the trunk lid would immediately snap open and block the driver's view.

By means of the present invention, it is ensured that, after the operation of an unlocking handle in the interior of the trunk, the trunk lid will not snap open in an uncontrolled manner during the drive. It is particularly advantageous to detect, during the operation of an unlocking handle in the interior of the trunk, the speed of the vehicle and to trigger the adjusting element for releasing a catch hook of the trunk lid only when the vehicle is standing still, that is, when the driving speed is v=0.

According to certain preferred embodiments of the invention, when the vehicle is moving, the operation of the unlocking handle starts a definable delay time, and the adjusting element for releasing the catch hook applied to the trunk lid is operated only after the expiration of this delay time. Advantageously, an indication of the situation to the driver also occurs simultaneously with the starting of the definable delay time. As a result, the driver has sufficient time to stop the vehicle and thus prevent a blocking of the driver's view when the trunk lid snaps open.

Advantageous further developments and measures are described herein and in the claims.

It is advantageous according to certain preferred embodiments of the invention, to design the unlocking handle situated in the interior of the trunk to be luminescent or to actively illuminate the unlocking handle. For a luminescent construction, a fluorescent layer can be applied to the locking handle, which will have an afterglow, when the trunk is closed. For an active illumination, the trunk illumination may be designed and controlled such that, when the trunk lid is closed, it will remain luminescent for an adjustable time.

According to certain preferred embodiments of the invention, a visual and/or acoustic driver information, which is triggered when the unlocking handle is operated, ensures that the driver will have sufficient time for stopping the vehicle before the delay time expires and thus avoid a dangerous situation when the trunk lid is opened.

Other objects, advantages and novel features of the present invention will become apparent from the following detailed description of the invention when considered in conjunction with the accompanying drawings.

DETAILED DESCRIPTION OF THE DRAWINGS

Figure 1:
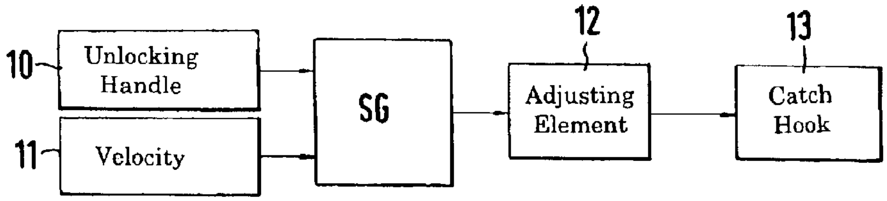
FIG. 1 is a schematic overview of the control elements for implementing the method according to the invention.

In FIG. 1, reference number 10 shows the unlocking handle arranged in the interior of the trunk, only a basic diagram being discussed here without any spatial arrangement. The unlocking handle 10 is connected with the control unit SG. When the unlocking handle is operated, a microswitch is actuated and the contact is detected in the control unit as a signal for the operation of the unlocking handle. Parallel to the signal of the unlocking handle, the signal of the speed v of the vehicle is detected in the control unit SG This is symbolically indicated in the figure by means of reference number 11. The control unit SG analyzes these signals and, when corresponding conditions exist, which will be explained in the following in conjunction with FIG. 2, controls an adjusting element 12 which then causes a release of the catch hook for the trunk lid 13.

Figure 2:
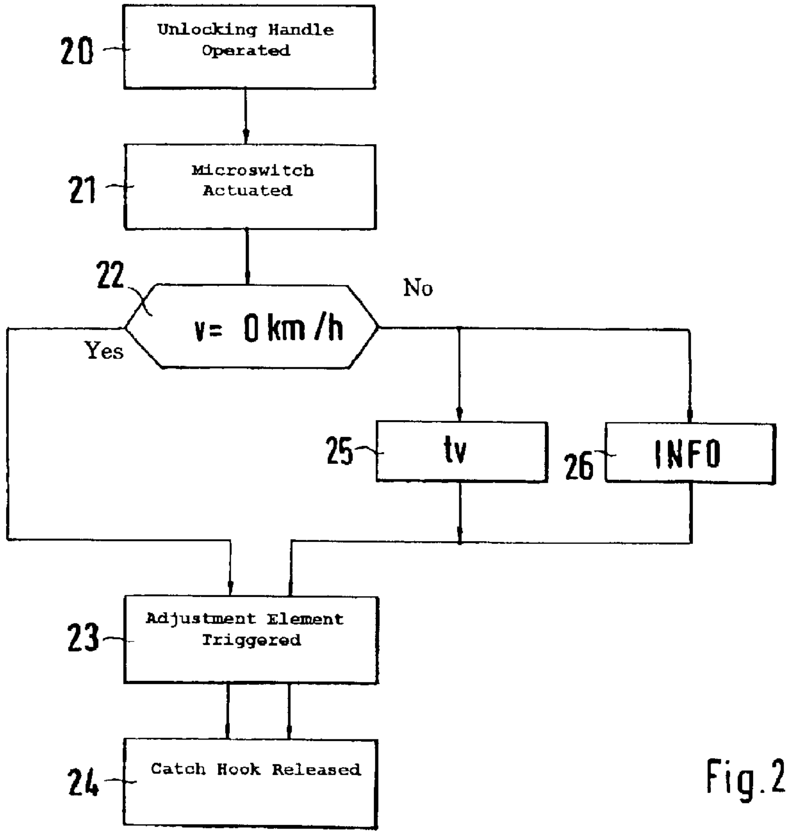
FIG. 2 is a basic diagram of the sequence of the method according to the invention.

FIG. 2 shows the individual process steps. In a first step 20, the unlocking handle in the trunk is operated, and by means of process step 21, a microswitch is actuated whose signal is detected in the control unit SG The signal of the microswitch, in another process step 22, causes the detection and checking of the actual speed of the vehicle. This signal exists in the vehicle anyhow, for example, for the ignition control. When the actual vehicle speed v is zero, this means that the vehicle is standing still, and the adjusting element 12 is triggered in process step 23, so that, in process step 24, the catch hook is released and the trunk lid can be opened. If, in process step 22, a speed was determined which is higher than zero, the vehicle is driving and, in process step 25, a delay time tv is started and, simultaneously, in working step 26, information is emitted to the driver. The driver information can be visual and/or acoustic in the vehicle interior. The driver now has sufficient time for braking the vehicle during the delay time and to stop the vehicle, so that, when the catch hook is released after the expiration of the delay time, no dangerous situation will be created.

In order to easily find the unlocking handle in the interior of the trunk, this unlocking handle may be constructed to be actively or passively illuminated. A fluorescent layer on the grip surface would, for example, be contemplated here. Another possibility is the active illumination, for example, by utilizing the interior illumination of the trunk.

Furthermore, it is possible to indicate the delay time t as a function of the actual speed of the vehicle or to have the driver set the delay time t according to certain preferred embodiments of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of unlocking a trunk lid of a vehicle, wherein, in an interior of the trunk, an unlocking handle is arranged, wherein, when the unlocking handle is operated, the speed (v) of the vehicle is detected, wherein, when it is detected that the vehicle is standing still, a release of the trunk lid takes place for opening the trunk lid, and wherein, when a driving vehicle is detected, a definable delay time (tv) is started and, after the expiration of the definable delay time (tv), the trunk lid is released for opening.

2. Method according to claim 1, wherein for releasing the trunk lid, an adjusting element is triggered which operates a catch hook applied to the trunk lid.

3. Method according to claim 1, wherein the delay time (tv) can be adjusted as a function of the speed of the vehicle (v).

4. Method according to claim 1, wherein when the unlocking handle is operated, the driver receives information in the interior of the vehicle.

5. Method according to claim 2, wherein when the unlocking handle is operated, the driver receives information in the interior of the vehicle.

6. Method according to claim 3, wherein when the unlocking handle is operated, the driver receives information in the interior of the vehicle.

7. Method according to claim 4, wherein the driver information is indicated visually and/or acoustically.

8. Method according to claim 5, wherein the driver information is indicated visually and/or acoustically.

9. Method according to claim 6, wherein the driver information is indicated visually and/or acoustically.

10. Method for unlocking a trunk lid on a passenger motor vehicle, comprising:

manually operating a trunk lid opening handle from within a trunk interior space by a person located in said interior space, detecting the vehicle speed, and controlling unlatching of the trunk lid as a function of the vehicle speed such that the manual operating of the trunk lid opening handle will result in unlatching of the trunk lid only after a predetermined time when the vehicle speed is above a predetermined valve.

11. Method according to claim 10, comprising providing a signal to a vehicle driver when the trunk lid opening handle is operated and the vehicle is moving.

12. Method according to claim 10, wherein said predetermined time is varied as a function of the vehicle speed at the time the trunk lid opening handle is operated.

13. Method according to claim 11, wherein said predetermined time is varied as a function of the vehicle speed at the time the trunk lid opening handle is operated.

14. Apparatus for unlocking a trunk lid on a passenger motor vehicle, comprising:

a manually operable trunk lid opening handle in a trunk interior space for operation by a person located in said interior space, means for detecting the vehicle speed, and means for controlling unlatching of the trunk lid as a function of the vehicle speed such that the manual operating of the trunk lid opening handle will result in unlatching of the trunk lid only after a predetermined time when the vehicle speed is above a predetermined valve.

15. Apparatus according to claim 14, comprising means for providing a signal to vehicle driver when the trunk lid opening handle is operated and the vehicle is moving.

16. Apparatus according to claim 14, wherein said predetermined time is varied as a function of the vehicle speed at the time the trunk lid opening handle is operated.

17. Apparatus according to claim 15, wherein said predetermined time is varied as a function of the vehicle speed at the time the trunk lid opening handle is operated.

* * * * *